Sept. 10, 1929. H. E. HUBBARD 1,727,882
RIBBON SPOOL
Filed April 18, 1927
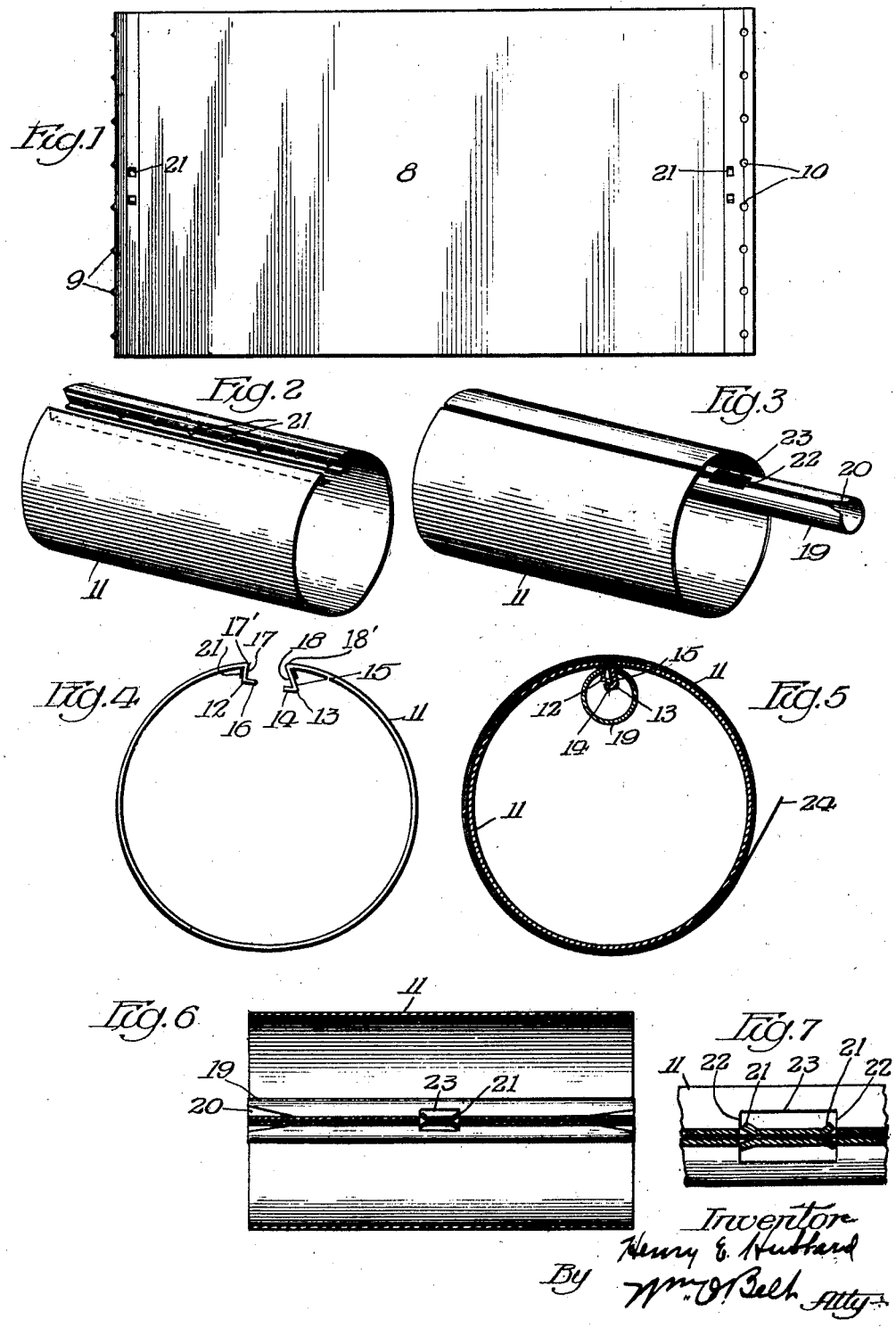

Patented Sept. 10, 1929.

1,727,882

UNITED STATES PATENT OFFICE.

HENRY E. HUBBARD, OF CHICAGO, ILLINOIS, ASSIGNOR, BY MESNE ASSIGNMENTS, TO ADDRESSOGRAPH COMPANY, OF CHICAGO, ILLINOIS, A CORPORATION OF DELAWARE.

RIBBON SPOOL.

Application filed April 18, 1927. Serial No. 184,676.

This invention relates to spools for holding ink ribbons and its object is to provide a novel spool of simple and inexpensive construction which can be easily secured upon the end of a ribbon.

Another object of the invention is to provide a spool with means for securing the end of a ribbon thereto so that it cannot be disengaged without tearing the ribbon, and so that the spool cannot be opened to release the ribbon without mutilating some of its parts.

And a further object is to provide a cylindrical spool divided longitudinally with interiorly disposed means for securing the spool in closed position upon the end of a ribbon.

And a still further object is to provide a divided cylindrical spool with inturned flanges at its marginal edges and a divided tubular clamp for endwise engagement with the flanges to secure the flanges upon an interposed ribbon.

In the accompanying drawings illustrating a selected embodiment of the invention:

Fig. 1 is a plan view of the spool blank.

Fig. 2 is a perspective view of the spool before it is closed.

Fig. 3 is a perspective view of the spool closed with the clamp partly applied.

Fig. 4 is an end view of the spool before it is closed.

Fig. 5 is a cross sectional view of the spool closed.

Fig. 6 is a longitudinal view of the spool closed.

Fig. 7 is a detail enlarged sectional view.

Referring to the drawings, 8 is the sheet metal blank from which the spool is formed, and it is provided with prongs 9 along one edge and with a row of openings 10, corresponding in position with the prongs, adjacent the opposite edge. The blank is formed into a cylinder 11, the edge margin having the prongs is bent to form an L shaped flange 12, and the opposite edge margin is bent to form an angular flange 13 which is reverse Z shape. The row of openings 10 is located in the angle formed where the lower member 14 adjoins the inclined member 15 of the flange 13. When the spool is closed the edge 16 of flange 12 seats in the recess of the angle formed by the members 14, 15 of the flange 13 and the shoulder 17 engages the shoulder 18 and forms a snug closure.

A clamp 19 in the form of a tube divided throughout its length is adapted to engage the flanges 12, 13 and secure them tightly and close the spool. At the ends of the clamp the marginal edges are cut away at 20 to facilitate engagement with the flanges. This clamp cylinder is preferably much smaller in diameter than the spool and it is of rigid construction to draw and hold the flanges snugly and securely together.

To lock the clamp to the spool I provide the flanges on the spool with dogs 21 to engage shoulders 22 at the ends of recesses 23 in the edges of the clamp, the dogs and receses being preferably located about midway between the ends of the spool and clamp.

In practice one end of an ink ribbon 24 is folded upon a blade of some kind (not shown) by which the folded end is squarely inserted between the flanges of an open spool and against the member 14 of flange 13, and then the flanges 12, 13 are pressed together and held upon the ribbon as the blade is withdrawn. One end of the clamp is then applied to the flanges at one end of the spool and is pushed into the spool to its final position with the dogs engaging the shoulders to lock the clamp in place. Thus the ribbon is securely and evenly gripped between the shoulders 17', 18' and between the end of the member 16 and the flange 13, and the prongs 9 penetrate the ribbon and seat in the openings 10. The ribbon is, to all intents and purposes, permanently secured to the spool so that it cannot be readily disengaged and replaced by another ribbon.

The invention provides means of simple and inexpensive construction whereby a ribbon may be easily and securely engaged with a spool and so that it cannot be disengaged without tearing the ribbon or mutilating the spool on its clamp. This it is practically impossible to remove a worn out ribbon from the spool for substituting a new ribbon of inferior grade to be sold with the spool as and for the original.

I have shown the invention in a form which I have found satisfactory for the intended purposes, but I reserve the right to make all such changes therein as come within the scope of the accompanying claims:—

I claim:

1. A ribbon spool comprising a cylinder divided longitudinally and provided with inturned flanges at its marginal edges, and means engaging said flanges to clamp the free edge of one flange against the other flange and upon an interposed ribbon.

2. A ribbon spool comprising a cylinder divided longitudinally and provided with inturned flanges at its marginal edges, means adapted for endwise engagement with said flanges to clamp them together upon an interposed ribbon, and means on the flanges for securing said ribbon independent of said clamping engagement.

3. A ribbon spool comprising a cylinder divided longitudinally and provided with inturned flanges at its marginal edges, and a tubular clamp adapted to be engaged with said flanges to secure them together upon an interposed ribbon, there being prongs on one of said members to penetrate said ribbon.

4. A ribbon spool comprising a cylinder divided longitudinally and provided with inturned flanges at its marginal edges, a tubular clamp divided longitudinally and adapted for endwise engagement with said flanges to secure them together upon an interposed ribbon, and means within the cylinder for locking the clamp thereto.

5. A ribbon spool comprising a cylinder divided longitudinally and having interiorly disposed gripping members, a tubular clamp divided longitudinally and engaging said members to secure them upon an interposed ribbon, and means within the cylinder approximately midway between the ends thereof for locking the clamp thereto.

6. A ribbon spool comprising a cylinder divided longitudinally and provided with inturned flanges at its marginal edges, a tubular clamp adapted to be engaged with said flanges to secure them together upon an interposed ribbon, and interlocking means on said cylinder and clamp.

7. A ribbon spool comprising a cylinder divided longitudinally and provided with inturned flanges at its marginal edges, a tubular clamp adapted to be engaged with said flanges to secure them together upon an interposed ribbon, and dogs on the flanges and shoulders on the clamp adapted to interlock.

8. A ribbon spool comprising a cylinder divided longitudinally and provided with inturned angular flanges at its marginal edges adapted to interengage, and means within the spool securing said flanges in engagement upon an interposed ribbon.

9. A ribbon spool comprising a cylinder divided longitudinally and provided with an inturned L shaped flange on one marginal edge and an inturned reverse Z shaped flange on its other marginal edge, and means within the spool securing said flanges in engagement upon an interposed ribbon.

10. A ribbon spool comprising a cylinder divided longitudinally and having inturned angular flanges on its marginal edges, one of said flanges having prongs and the other flange having openings to receive said prongs, and means within the spool securing said flanges in engagement upon an interposed ribbon.

11. A ribbon spool comprising a cylinder divided longitudinally and having inturned angular flanges on its marginal edges, and a clamp adapted to press said flanges together upon an interposed ribbon and comprising a divided tube within the spool, the ends of the marginal edges at one end of the clamp being cut away.

12. A ribbon spool comprising a cylinder divided longitudinally and having inturned angular flanges on its marginal edges, and a clamp adapted to press said flanges together upon an interposed ribbon and comprising a divided tube, the marginal edges of said tube having recesses and shoulders at the ends of the recesses, and dogs on the cylinder to interlockingly engage said recesses.

13. A device of the class described, comprising a resilient cylindrical ribbon spool split longitudinally and provided with inwardly directed flanges extending along the edges of the split portion, and means for slidable engagement with the flanges longitudinally thereof to clamp the flanges upon an interposed ribbon.

14. A device of the class described, comprising a resilient cylindrical ribbon spool split longitudinally and provided with inwardly directed flanges extending along the edges of the split portion, and a smaller split tube insertable endwise into the spool with the flanges received in the split portion of the smaller tube to clamp the flanges upon an interposed ribbon.

HENRY E. HUBBARD.